UNITED STATES PATENT OFFICE.

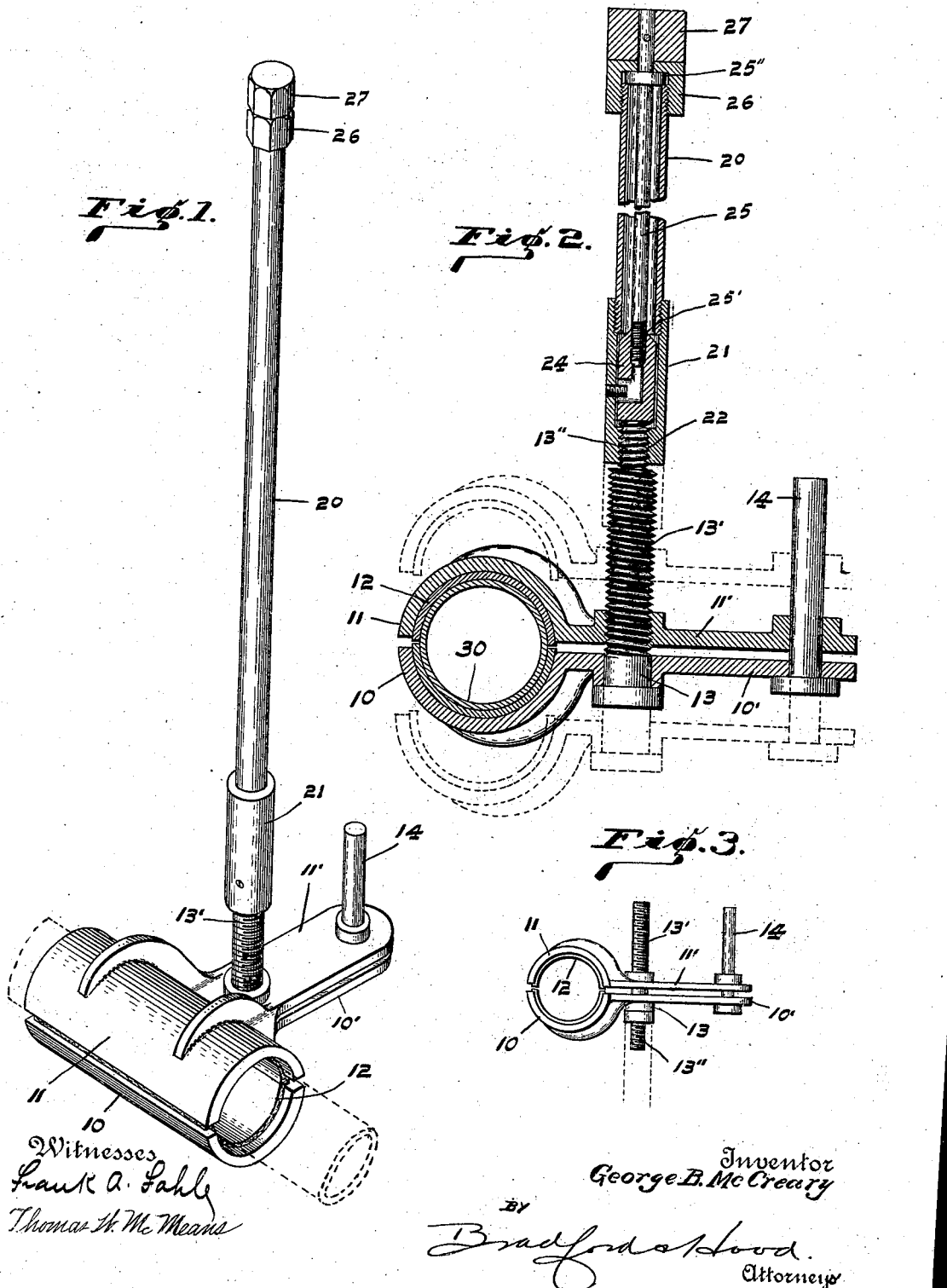

GEORGE B. McCREARY, OF INDIANAPOLIS, INDIANA.

HOSE OR PIPE MENDER.

No. 847,594. Specification of Letters Patent. Patented March 19, 1907.

Application filed November 5, 1906. Serial No. 342,006.

*To all whom it may concern:*

Be it known that I, GEORGE B. McCREARY, a citizen of the United States, residing at Indianapolis, in the county of Marion and State of Indiana, have invented certain new and useful Improvements in Hose or Pipe Menders, of which the following is a specification.

The object of my invention is to produce a device for closing breaks in pipes or hose, the structure being especially adapted for application to broken pipes which either by reason of their position or by reason of the material passing out through the break are inaccessible.

The accompanying drawings illustrate my invention.

Figure 1 is a perspective view of my device with the applying holder in position. Fig. 2 is a sectional detail, and Fig. 3 a detail of a modification.

In the drawings, 10 and 11 indicate a pair of mating semitubular members provided upon their inner faces with suitable packing-strips 12. Members 10 and 11 are provided with coöperating extensions 10' and 11'. Rotatably mounted in the member 10' is a bolt 13, provided with a threaded shank 13', threaded through the extension 11' of the member 11, the arrangement being such that when the bolt 13 is turned the two members 10 and 11 will be drawn together or forced apart. In order to serve as a guide for the two members 10 and 11 and keep their semitubular portions in alinement, I provide the extension 10' with a guide-pin 14, which extends through a suitable opening formed in the extension 11'. In order to apply the clamp, I provide a holder 20, of any desired length, said holder having at one end a head 21, having threads 22 adapted to receive a threaded extension 13'' of bolt 13. The threaded extension 13'' is preferably formed upon the same end of bolt 13 as the threaded portion 13', and if this is done the threads 13'' should be opposite to the threads 13', so that by screwing head 21 upon the threads 13'' the entire mending-clamp may be held and shifted about by the holder 20, and by rotating the holder in the direction of screwing the same tighter upon the threads 13'' the bolt 13 will be rotated in such direction as to cause the threads 13' to draw the two members 10 and 11 together. The threaded portion 13'' may be formed upon the opposite end of the bolt 13, as illustrated in Fig. 3, and in this case the threads would run in the same direction as the threads 13'.

When considerable force is necessary in order to clamp the members 10 and 11 upon the pipe, there is of course a tendency to crowd the head 21 so tightly upon the threads 13'' that in attempting to unscrew the head 21 the bolt 13 would be turned in a reverse direction, thus loosening the members 10 and 11 on the pipe being mended. This would of course be undesirable, and in order to prevent such action I make the head 21 and holder 20 hollow and mount within head 21 a movable abutment 24. The abutment 24 is carried upon the threaded end 25' of a shaft 25 journaled in the holder 20 and held against axial movement therein by a collar 25'' and a cap 26. Shaft 25 at its outer projected end is operated with a head 27, by means of which it may be turned.

In operation the bolt 13 is turned until the members 10 and 11 are separated sufficiently to permit the said members to be slipped transversely over a pipe 30. The head 21 of holder 20 is then screwed upon threads 13'', the end of the portion carrying these threads coming against the end of the abutment 24. The holder 20 being of sufficient length the device may then be slipped over the pipe 30, even though the pipe be at a considerable distance, and the device then moved until one of its members—say the member 10—is seated upon the pipe. Thereupon the holder 20 is turned in a direction which tends to screw it more tightly upon the threads 13'', and this motion causes the bolt 13 to turn in such direction as to draw the member 11 toward the member 10, so that by this means the two members 10 and 11 may be tightly clamped upon the pipe. Thereupon the operator by turning the head 27 turns shaft 25 in such direction as to draw the abutment 24 away from the inner end of the threaded portion 13'', thus loosening the holder upon said threaded portion, whereupon the head may be readily drawn off from the threaded portion 13'' without disturbing the bolt 13.

I claim as my invention—

1. A mending-clamp for pipes, comprising a coacting pair of members adapted to receive the pipe, a threaded bolt adapted to draw said members together, said threaded bolt having a secondary threaded portion so arranged relative to the main threaded portion that a member screwed thereon will tend to rotate the bolt in such direction as to draw the two members together.

2. A mending-clamp for pipes comprising a coacting pair of members adapted to receive the pipe, a threaded bolt adapted to draw said members together, said threaded bolt having a secondary threaded portion of opposite pitch formed at one end of the bolt, for the purpose set forth.

3. The combination, with a mending-clamp for pipes comprising a coacting pair of members adapted to receive the pipe, a threaded bolt adapted to draw said members together, said threaded bolt having a secondary threaded portion so arranged relative to the main threaded portion that a holder screwed thereon will tend to rotate the bolt in such direction as to draw the two members together, of a holder for said clamp, said holder having a threaded head adapted to received the secondary threaded portion of the bolt.

4. The combination, with a mending-clamp for pipes comprising a coacting pair of members adapted to receive a pipe, a threaded bolt adapted to draw said members together, said threaded bolt having a secondary threaded portion so arranged relative to the main threaded portion that a holder screwed thereon will tend to rotate the bolt in such direction as to draw the two members together, of a holder for said clamp, said holder having a threaded head adapted to receive the secondary threaded portion of the bolt, a movable abutment carried by said holder in position to receive the thrust from the secondary portion of the bolt, and means for backing said abutment away from said secondary portion.

5. The combination, with a mending-clamp for pipes comprising a coacting pair of members adapted to receive the pipe, and a threaded bolt adapted to draw said members together, said threaded bolt having a secondary threaded portion so arranged relative to the main threaded portion that a holder screwed thereon will tend to rotate the bolt in such direction as to draw the two members together, of a holder for said clamp, said holder having a threaded head adapted to receive the secondary threaded portion of the bolt, an abutment mounted within said holder in position to receive the thrust from the secondary portion of the bolt, a shaft journaled in the holder and having a threaded connection with said abutment whereby said abutment may be backed away from the bolt.

6. The combination with a mending-clamp comprising a coacting pair of members adapted to receive the pipe, and a threaded bolt adapted to draw said members together, said threaded bolt having a secondary threaded portion of opposite pitch formed at one end of the bolt, of a holder having a threaded head adapted to receive said secondary threaded portion, for the purpose set forth.

7. The combination, with a mending-clamp comprising a coacting pair of members adapted to receive the pipe, and a threaded bolt adapted to draw said members together, said threaded bolt having a secondary threaded portion of opposite pitch formed at one end of the bolt, of a holder having a threaded head adapted to receive said secondary portion, a movable abutment carried by said holder in position to receive the thrust from said secondary threaded portion of the bolt, and means for backing said abutment away from the bolt.

8. The combination, with a mending-clamp comprising a coacting pair of members adapted to receive the pipe, and a threaded bolt adapted to draw said members together, said threaded bolt having a secondary threaded portion of opposite pitch formed at one end of the bolt, of a holder having a threaded head adapted to receive said secondary threaded portion, a movable abutment mounted within said holder in position to receive the thrust from the secondary portion of the bolt, and a shaft rotatably mounted within the holder and having a threaded connection with said abutment whereby the abutment may be backed away from the secondary portion of the bolt.

In witness whereof I have hereunto set my hand and seal, at Indianapolis, Indiana, this 2d day of November, A. D. 1906.

GEORGE B. McCREARY. [L. S.]

Witnesses:
ARTHUR M. HOOD,
THOMAS W. McMEANS.